Figure 1:
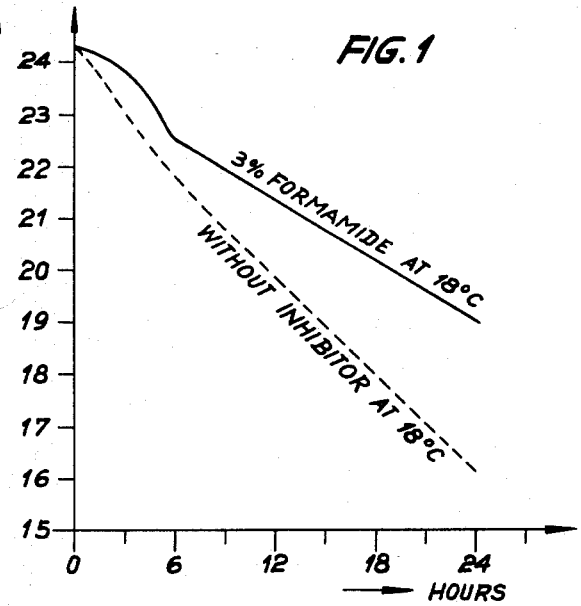

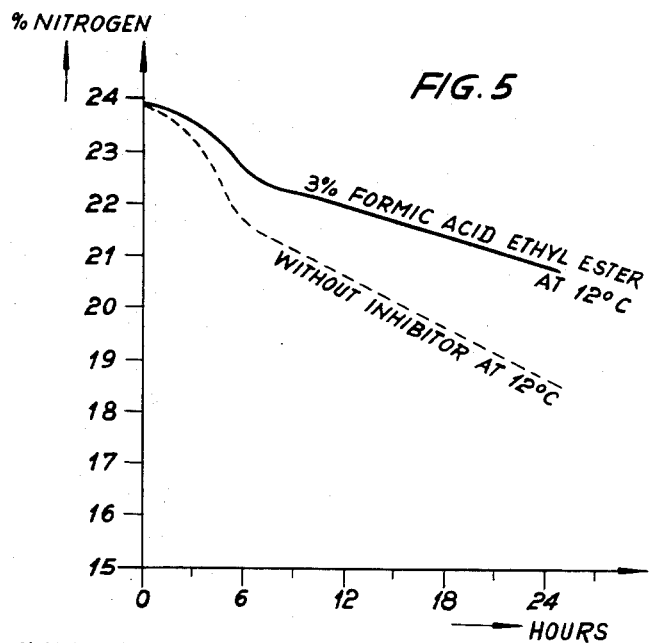
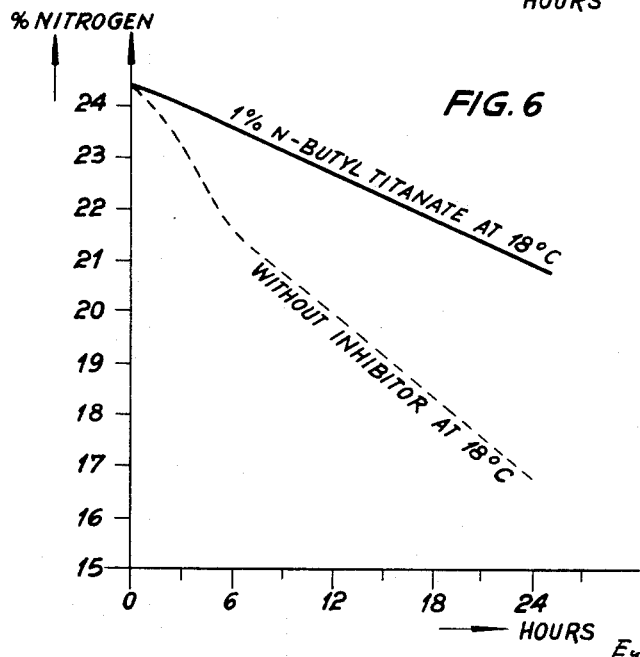

3,251,796
PREPARATION OF ACRYLONITRILE FIBERS FROM SULPHURIC ACID SOLUTIONS CONTAINING SOLUBLE SULFATES AND AMIDES
Werner Saar, Egon Norbert Petersen, and Wilhelm Irion, Neumunster, Germany, assignors to Phrix-Werke Aktiengesellschaft, Hamburg, Germany
Filed Jan. 24, 1962, Ser. No. 168,458
Claims priority, application Germany, Aug. 8, 1960, P 25,489; Jan. 30, 1961, P 26,484
12 Claims. (Cl. 260—29.6)

The present invention relates to a composition for and a method of extruding or spinning high polymers and, more particularly, the present invention is concerned with spinning solutions and a spinning method for polyacrylonitrile dissolved in sulfuric acid, the term "polyacrylonitrile" is to denote in the context in which this term is used herein, not only polyacrylonitrile per se but also mixed polymers and copolymers of acrylonitrile.

The present application is a continuation-in-part of our co-pending application Serial No. 129,661, filed August 7, 1961, and entitled "Stabilized Solutions of Nitrogen-Containing High Polymers in Strong Acids."

Broadly, it is possible to dissolve polyacrylonitriles in sulfuric acid having a concentration of between about 65% and 85%. At the lower end of this range of acid concentration, dissolution of the polyacrylonitrile occurs only very slowly, particularly at the relatively low spinning temperatures of between about 10 and 20° C. which generally are to be maintained. As the concentration of the acid increases, the solubility and the speed of dissolution of the polyacrylonitrile improves. However, at higher sulfuric acid concentrations the rate of decomposition or saponification of the dissolved polyacrylonitrile increases so that the quality of the spun or extruded product is impaired, or that it is no longer possible to process the solution, particularly if the same has been allowed to stand for some length of time prior to processing. Furthermore, at the upper end of the concentration range, the viscosity of the solution is found to rise to unmanageable values.

Thus, while dissolution of polyacrylonitrile in sulfuric acid having a concentration of between 65 and 68% is theoretically possible, it is generally too slow and difficult a process for practical purposes. Dissolution of the polymer in sulfuric acid of between 68 and 70% concentration proceeds somewhat faster and easier, however, for most purposes primarily sulfuric acid concentrations of between 70 and 80% are to be considered.

Here again, particularly in the lower half of this range, namely between about 70 and 75% considerable difficulties are experienced due to the limited and slow solubility of the polyacrylonitrile, while in the upper half of this range, namely between about 75 and 80%, the solubility of the polyacrylonitrile is greatly improved, however, the rate of saponification and decomposition of the high polymer increases greatly with thus increased sulfuric acid concentrations.

It will be understood from the foregoing that broadly it is possible to dissolve polyacrylonitriles in sulfuric acid of between 65 and 85% concentration, however that for practical reasons generally only the concentration range of from 68% or 70% to 80% is considered, and frequently the concentration range is limited to between about 71 and 73%.

The lower the concentration of the sulfuric acid, the more difficult it becomes to dissolve the polyacrylonitrile, however, solutions of polyacrylonitrile in sulfuric acid of relatively low concentration are less subject to saponification. On the other hand, the higher the concentration of the sulfuric acid, the easier it is to dissolve the polyacrylonitrile, however, the rate of saponification of the dissolved polyacrylonitrile increases with the increase in the concentration of the sulfuric acid.

It is therefore an object of the present invention to overcome the above discussed difficulties, particularly with respect to dissolution and saponification of polyacrylonitrile spinning solutions (the term "spinning solution" being meant in its broadest sense, referring to solutions which may be extruded in any conventional manner) in sulfuric acids of a relatively broad range of concentrations.

It is another object of the present invention to overcome the difficulties with respect to dissolving polyacrylonitrile, particularly in sulfuric acid of relatively low concentration.

It is a further object of the present invention to overcome the difficulties which up to now existed with respect to undesirable decomposition such as saponification of polyacrylonitrile, particularly in sulfuric acid of relatively high concentration.

It is yet another object of the present invention to provide a spinning solution and a spinning method wherein the solubility of polyacrylonitrile in sulfuric acid is improved and simultaneously the rate of decomposition of the dissolved polyacrylonitrile is reduced.

Other objects and advantages of the present invention will become apparent from a further reading of the description and of the appended claims.

With the above and other objects in view, the present invention contemplates in a method of extruding a nitrogen-containing high polymer soluble in concentrated sulfuric acid and adapted to be saponified by concentrated sulfuric acid from a solution of the high polymer in concentrated sulfuric acid, the improvement which comprises having incorporated in the solution a substance adapted to react with the concentrated sulfuric acid at a greater rate of speed than the rate at which the saponification of the high polymer by the concentrated sulfuric acid proceeds, and a sulfate soluble in the concentrated sulfuric acid, whereby saponification of the high polymer will be retarded due to the presence of the substance, and the solubility of the high polymer in the concentrated sulfuric acid will be improved due to the presence of the sulfate.

The present invention also includes in a method of making acrylonitrile polymer fibers, the steps of forming a spinning solution of a high polymer selected from the group consisting of polyacrylonitrile and mixed polymers as well as copolymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrolidone, vinyl amide, vinyl pyridine, vinylidene cyanide, methacrylic acid nitrile and vinyl amide in sulfuric acid having a concentration of between 65 and 85% and having dissolved therein a substance adapted to react with the sulfuric acid at a greater rate of speed than the rate at which the high polymer will be saponified by the sulfuric acid the substance being selected from the group consisting of carboxylic acid amides, acetoacetic ester, formic acid-ethyl ester, ammonium formiate, ammonium acetate, acetanhydride, propionic acid anhydride, acetyl acetone, $\beta,\beta'$-dicyandiethyl sulfide, acetyl urea, n-butyl titanate, o-phosphoric acid, N-acetyl-ethanolamine, glycolic acid-n-butyl ester, caprolactam and acetanilide, and also having dissolved therein a sulfate soluble in the concentrated sulfuric acid and selected from the group consisting of aluminum sulfate and ammonium sulfate, whereby saponification of the high polymer will be retarded due to the presence of the substance, and the solubility of the high polymer in the concentrated sulfuric acid will be improved due to the presence of the sulfate, and extruding the thus formed spinning solution through a spinneret into a coagulating bath adapted to coagulate the dissolved acrylonitrile polymer so as to form fibers of acrylonitrile polymer in the coagulating bath.

The term "mixed polymers" as used herein is meant also to include "copolymers" of acrylonitrile.

The acrylonitrile polymer spinning solution according to the present invention may comprise sulfuric acid of between about 70 and 80% concentration having dissolved therein between about 1 and 16% by weight of a high polymer selected from the group consisting of polyacrylonitrile and mixed polymers and copolymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrolidone, vinyl amide, vinyl pyridine, vinylidene cyanide, methacrylic acid nitrile and vinyl amide, and also having dissolved therein between about 1 and 5% by weight of a substance adapted to react with the sulfuric acid at a greater rate of speed than the rate at which the high polymer will be saponified by the sulfuric acid the substance being selected from the group consisting of carboxylic acid amides, acetoacetic esters, formic acid-ethyl ester, ammonium formiate, ammonium acetate, acetanhydride, propionic acid anhydride, acetyl acetone, $\beta,\beta'$-dicyandiethyl sulfide, acetyl urea, n-butyl titanate, O-phosphoric acid, N-acetyl-ethanolamine, glycolic acid-n-butyl ester, caprolactam and acetanilide, and further having dissolved therein between about 0.5 and 5% of a sulfate soluble in the concentrated sulfuric acid and selected from the group consisting of aluminum sulfate and ammonium sulfate, whereby saponification of the high polymer will be retarded due to the presence of the substance and the solubility of the high polymer in the concentrated sulfuric acid will be improved due to the presence of the sulfate.

Particularly, if the polymer is to be dissolved in an acid of relatively high concentration, the stabilized high polymer solution according to the present invention may comprise a strong acid having dissolved therein a nitrogen-containing high polymer soluble in the strong acid and adapted to be saponified by the strong acid, and also containing a substance adapted to react with the strong acid at a greater rate of speed than the rate at which the saponification of the high polymer by the strong acid proceeds.

On the other hand, when the polymer is to be dissolved in sulfuric acid of a relatively low concentration, then the spinning solution according to the present invention may comprise sulfuric acid of at least 65% concentration having dissolved therein an acrylonitrile polymer and a sulfate soluble in the sulfuric acid, whereby the solubility of the acrylonitrile polymer is improved due to the presence of the dissolved sulfate.

Referring now to the features of the present invention which relate to stabilized solution of nitrogen-containing high polymers in strong acids, and more particularly to solutions of high polymers such as polyacrylonitrile in strong acids such as sulfuric acid which solutions are to remain stable over markedly longer periods of time, even at normal temperatures, than the known solutions thereof, it should be understood that it is known to form solutions of polyacrylonitrile, particularly at temperatures slight above 0° C., in strong, for example about 75% or more sulfuric acid. The polymer content of such solution, for instance, may be 8% polyacrylonitrile.

By working rapidly it is possible to precipitate the polyacrylonitrile from the sulfuric acid in more or less unchanged condition.

It has however been shown that the sulfuric acid under normal conditions rapidly saponifies the cyano groups of the polyacrylonitrile in the solution. As a result the value of the polyacrylonitrile precipitated from the solution after some time is greatly diminished. The same applies for solutions of polyacrylonitrile in other acids, such as hydrochloric acid or nitric acid, although in these acids the saponification proceeds somewhat slower than in the case of sulfuric acid.

The saponification of the polymers is lessened by forming the solutions at lower temperatures and storage of these solutions also at lower temperatures and also by shortening the time between the formation of the solutions and the precipitation of the polymers therefrom. However, in practical carrying out of the technique it is not possible to operate at temperatures which are too low because, on the one hand the operation at very low temperatures requires a high degree of energy for cooling, and on the other hand the viscosity of the solutions at low temperatures is so greatly increased that the handling and deaerating thereof poses considerable difficulties. When operating at higher temperatures, however, the time interval for the working up of solutions to form all types of articles such as films, foils, ribbons, filaments and fibers is considerably shortened.

It is therefore also an object of the present invention to provide stable high polymer solutions which remain stable at relatively higher temperatures and which do not have too high a viscosity.

It is yet another object of the present invention to provide stable solutions of high polymers such as polyacrylonitrile or copolymers or mixed polymers thereof wherein the time of handling of the solutions for the formation of all types of articles such as films, foils, fibers, etc. therefrom is greatly increased, and in addition it is possible to work with such solutions at relatively higher temperatures.

The acid may be any strong acid such as the strong mineral acids sulfuric acid, hydrochloric acid or nitric acid. Generally the acid would be sulfuric acid, preferably of 65-85% concentration, and most preferably of about 70-75% concentration.

The invention is in general applicable to polyacrylonitrile as well as mixed polymers and copolymers of acrylonitrile with acrylic acid esters, methacrylic acid esters, vinyl acetate, vinyl chloride, vinylidene chloride alkenyl-carboxylic acid amides, alkenyl-carboxylic acids, allyl chloride, allyl alcohol, vinyl pyrolidone, vinyl amide, vinyl pyridine, vinylidene cyanide, methacrylic acid nitrile and vinyl amide.

The high polymer in the strong acid solutions of the present invention is preferably one which consists at least 85% of polyacrylonitrile, and most preferably between 95 and 98% of the total polymerisate consist of polyacrylonitrile.

The degree of polymerization of the high polymer may vary within a wide range, and is preferably between about 500 and 1500, and most preferably between about 900 and 1200.

The amount of the polymer such as polyacrylonitrile or a mixed or a copolymer thereof may also vary within wide ranges. Generally, the amount of the polymer is between 1 and 16% by weight, preferably between about 4 and 14% by weight, still more preferably between 5 and 12% by weight, and most preferably between about 6 and 10% by weight.

The inhibitor, which is preferable present in the acid solution in an amount of about 1–5% by weight, and most preferably in an amount of about 2.5% by weight is preferably of the type which contains amide or nitrile groups. Among the compounds which are suitable as inhibitors for the purposes of the present invention may be mentioned carboxylic acid amides such as formamide and acetamide, chloracetamide, dichloracetamide, trichloracetamide, diacetamide, proprionic acid amide, n-butyric acid amide, isobutyric acid amide, n-valeric acid amide, oxamide, malonic acid diamide, adipic acid diamide, etc. Other suitable compounds for use as inhibitors in accordance with the present invention includes carboxylic acid esters such as acetoacetic ester, formic acid-ethyl ester, oxamic acid-ethyl ester, as well as carboxylic acids themselves, preferably in the form of their ammonium salts, such as ammonium formiate, ammonium acetate, as well as carboxylic acid anhydrides such as acetanhydride, propionic acid anhydride, beta-diketones such as acetyl acetone, and other compounds such as beta,beta'-dicyandiethyl sulfide, acetyl urea, n-butyl titanate, o-phosphoric acid, N-acetyl-ethanolamine, glycolic acid-n-butyl ester, caprolactam and acetanilide.

It has been found according to the present invention that the saponification of cyano group-containing high polymers, or the like, in strong acid solution, particularly in sulfuric acid solution, is greatly retarded by adding to to the polymer solution in the strong sulfuric acid a substance which reacts with the acid at a greater rate of speed than the speed at which the polymer is saponified by the acid. In the case of polyacrylonitrile solutions it has been determined that the damage to the dissolved polymer is prevented by the addition of substances which react more quickly with the acid than does the saponification of polyacrylicamide proceed.

The following describes simple pretesting that may be carried out to determine whether or not a given substance will act as an effective inhibitor in accordance with the method of the present invention.

Thus, for example, this acrylicamide or polyacrylicamide is dissolved in 74% sulfuric acid at 50° C. and the time is determined for half of the dissolved amide to become saponified—this time being designated herein as the half-time value, it is found that the time required is 514 hours. Accordingly, it has been found that in accordance with the present invention various substances are active inhibitors, i.e., act to retard the saponification of the polymer in the sulfuric acid, which at 50° C. in 74% sulfuric acid have a half-time value of less than 514 hours. Accordingly, all substances which under given conditions have a half-time value which is less than the half-time value of the polymer such as acrylicamide or polyacrylicamide under the same conditions may be used as an inhibitor in accordance with the present invention.

If such compound is added to a solution of polyacrylicnitrile in 65-85% sulfuric acid, for example, a concurrent reaction occurs between the nitrile groups of the polymers and the more easily attackable inhibitor whereby the latter is attacked first and consequently the saponification process of the cyano groups of the polymer is retarded. This occurs at least until the inhibitor as the main attacking point of the sulfuric acid is used up and is thereby eliminated.

It is interesting to note in this connection that by measuring the viscosity of the solution it is observed that obviously mainly only the functional groups of the polymeric compounds are changed by the sulfuric acid, or split thereby, while the chain length of the polymer at least during the first 24 hours is hardly changed at all. Thus, from the known phenomena it may be realized that the reactions which occur in the side chain does not affect the viscosity of the polymer or of the polymer solution.

As indicated above the determination of the half-time value of a substance as compared to the half-time value of the particular polymer, under the same conditions, indicates whether or not such substance can be used as an inhibitor for the purposes of the present invention. Thus, in the case of acrylicamide or polyacrylicamides if the half-time value of a substance in 74% sulfuric acid at 50° C. is more than 514 hours, such substance cannot be used as an inhibitor, whereas if the half-time value is less than 514 hours it can be used as an inhibitor. For example, urea or benzamide are practically not saponified at all by 74% sulfuric acid at 50° C. Consequently these substances are not inhibitors. Contrary thereto, trichloracetamide can be used as an inhibitor since its half-time value under the same conditions is 27.5 minutes.

Likewise, n-capronamide which has a half-time value of 270 hours can also be used as an inhibitor.

The activity of various substances is indicated in the following table. In addition, the change of nitrogen content of polyacrylonitrile dissolved in 74% sulfuric acid was also measured and is indicated in the table. The amount of the inhibitor in each case mounted to 2.5% of the solution.

TABLE 1

| Addition | T | Percent Nitrogen after— | | | |
|---|---|---|---|---|---|
| | | 0 hrs. | 3 hrs. | 6 hrs. | 24 hrs. |
| None | | 23.84 | 21.93 | 20.66 | 16.29 |
| 2.5% Acetylacetone | about 4 | 23.42 | 22.64 | 21.33 | 17.62 |
| 2.5% Formamide | 2.8 | 23.61 | 22.98 | 21.85 | 17.41 |
| 2.5% Acetamide | 144 | 23.50 | 22.63 | 21.23 | 17.38 |
| 2.5% n-Capronamide | 270 | 23.50 | 22.93 | 21.98 | 17.00 |
| 2.5% Urethane | 33 | 23.44 | 22.56 | 21.53 | 17.16 |
| 2.5% Cyanacetamide | 6 | 23.46 | 22.64 | 21.21 | 16.97 |

T=half-time value in 74% H₂SO₄ at 50° C. in hours.

The following table gives further experimental measurements of the half-time value in 74% sulfuric acid at 50° C. of various substances.

TABLE 2

| Substance | T | Remarks |
|---|---|---|
| Chloracetamide | 9.9 hours | |
| Dichloracetamide | 39.5 minutes | |
| Trichloracetamide | 27.5 minutes | |
| Diacetamide | 143 hours | |
| Propionic acid amide | 129 hours | |
| n-Butyric acid amide | 272 hours | |
| Iso-butyric acid amide | 250 hours | |
| n-Valeric acid amide | 229 hours | |
| Iso-valeric acid amide | 820 hours | Not an inhibitor. |
| Oxamide | 2 hours | |
| Oxamic acid-ethyl ester | 106 minutes | |
| Malonic acid diamide | 22 hours | |
| Adipic acid diamide | 203 hours | |
| Pivalic acid amide | 40.5 days | Not an inhibitor. |
| D,L-methyl-ethyl-acetamide | 33 days | Not an inhibitor. |

The determination of the half-time value is carried out by various known methods, depending on the particular inhibitor tested. In the case of the use of acid amides, such as formamide, the so-called urotropine reaction by which it is possible to determine ammonium salts in addition to such compounds which upon cooking with alkali lyes develop ammonia. This reaction is based on the fact that, for example in the saponification of acrylic amide or formamide in concentrated sulfuric acid the ammonia split off and present in the form of ammonium sulfate is bound after careful neutralization of the sulfuric acid by the addition of formaldehyde as hexamethylenetetramine, whereby a corresponding equivalent of acid is formed which can be titrated by means of a special indicator.

For the determination of acetyl acetone the so-called color reaction of diketones with ferric salts which is described in the literature is used, this reaction depending on the formation of a chelate. In this case there is determined during the saponification by colorimetric means how much of the original diketone inhibitor which was added is still present.

The amount of the inhibitor added to the solution of the polymer depends on various conditions. In the first place the solubility of the polymer in the sulfuric acid should not be unfavorably influenced. Furthermore, the viscosity of the solution should if possible not be increased. The development of gas is always undesired since in such case the materials precipitated from the solution such as filaments, fibers and films then exhibit corresponding holes and tears. In normal cases the amount of the addition of inhibitor is about 1-5% calculated with respect to the final solution. With a higher inhibitor concentration there is of course achieved a better stabilization than with a lesser concentration or concentrations.

However, with concentration above about 5% of inhibitor the same may not be compatible with the polymer solution.

The preferred inhibitors to be used in accordance with the present invention have a half-time value of about 2–300 hours and act to inhibit the action on the polymer during a storage time of 3–24 hours.

The most certain control for determining whether or not a specific inhibitor will give the desired effect is the determination of the relationship of the time to the loss of nitrogen content of the polymer calculated with respect to the nitrogen content of the starting sample, as will be shown in the curves of the figures of the attached drawings and as discussed in the examples relating thereto.

In the following examples the action of inhibitors on the behavior of 10% polyacrylonitrile solutions in 74% sulfuric acid at various temperatures is described. The scope of the invention is not, however, meant to be limited to the specific details of the examples.

Example 1

20 g. of polyacrylonitrile (mixed polymerisate of 97% acrylicnitrile with 3% methacrylic acid methyl ester) are stirred with 90 g. of 68% sulfuric acid at 18° C. and degassed under vacuum whereupon a solution of 6 g. of formamide (3%) in 90 g. of 80% sulfuric acid (freshly prepared under cooling) is sucked in under vacuum while stirring. The mass is maintained at a constant temperature of 18° C. by cooling from the outside with water. The obtained clear, practically colorless polyacrylonitrile solution is stored in a thermostat controlled storage area at 18° C. and at various time intervals test samples are taken for the formation of films. In this connection the test sample of the polymer solution is manually pressed between glass plates to a film, the polymer precipitated by means of water, the film washed in running water for 24 hours and subsequently the neutral film (tested by means of bromphenol blue) is dried at room temperature.

A comparison solution prepared in the same manner and same concentrations, however, without formamide, can no longer form a film after 48 hours, whereas the above described solution containing the formamide inhibitor can still form films after 72 hours. FIG. 1 shows the decrease of nitrogen content of the film with respect to the time, comparing the films with the formamide and those without the formamide inhibitor.

Example 2

A polyacrylonitrile solution in 74% sulfuric acid is prepared analogously to Example 1 with the addition of 3% formamide, at 12° C. and the solution is stored at this temperature.

After 53 hours the comparison solution prepared without the addition of formamide no longer can form films while with the formamide inhibitor the solution can still form films after 78 hours.

Figure 2:
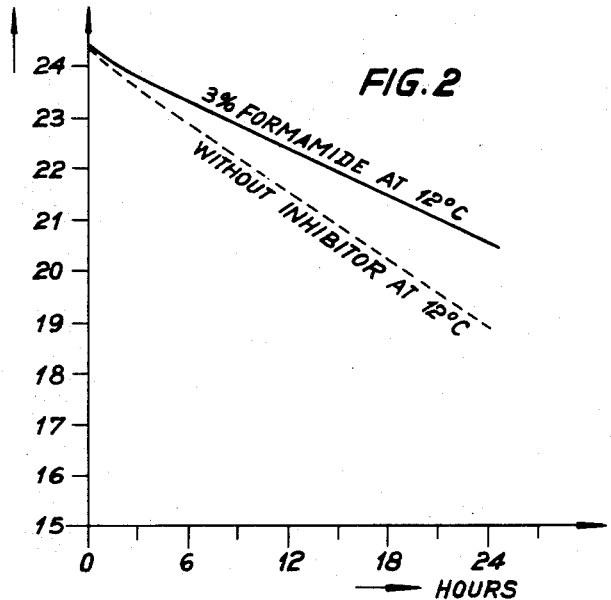

The nitrogen content of the films formed at the same time under the same conditions is set forth in FIG. 2.

Example 3

Figure 3:
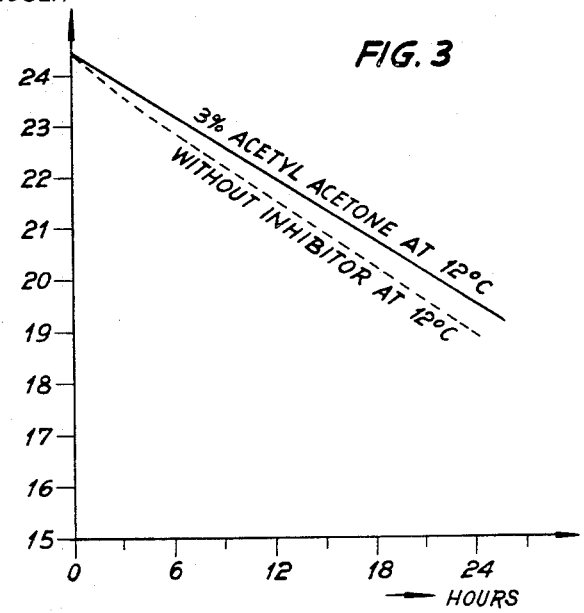

A 10% polyacrylonitrile solution is prepared with an addition of 3% acetylacetone at 12° C. and stored at this temperature. After 72 hours this solution is still suitable for film formation, while a comparison solution without the addition of the inhibitors after 48 hours can be used for the last time to form a very weak film. The course of nitrogen values in relation to the time is set forth and prepared in FIG. 3.

Example 4

Figure 4:
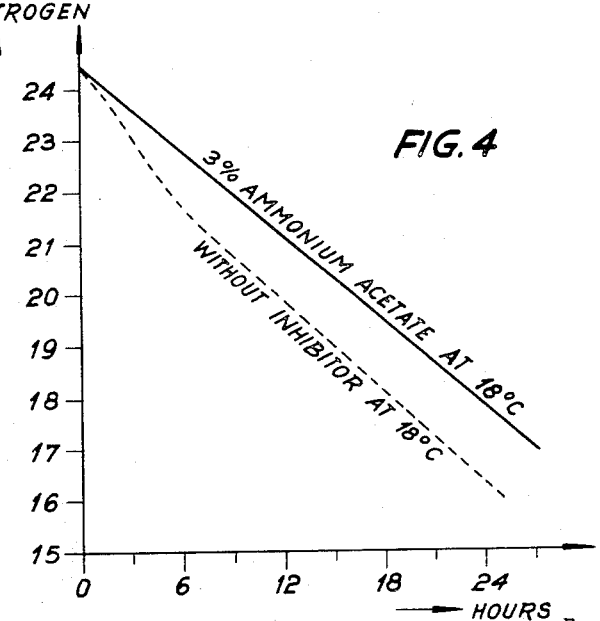

In the manner described in Example 1 a solution of polyacrylonitrile is prepared with 3% ammonium acetate as inhibitor, the solution being prepared and stored at 18° C. The decrease in the nitrogen content of the film with varying ages of the polyacrylonitrile solution is shown in FIG. 4.

Example 5

A 10% polyacrylonitrile solution in 74% sulfuric acid is prepared as described in Example 1 at 12° C. with an addition of 3% formic acid-ethyl ester as inhibitor and is compared to the same solution without the addition of the inhibitor. The change in nitrogen content of the polyacrylonitrile from the two solutions is compared in FIG. 5.

Example 6

In accordance with the two step solution method described in Example 1 a 10% polyacrylonitrile solution is produced in 74% sulfuric acid at 18° C. and 1% n-butyl-titanate is added thereto. In the same manner a solution is prepared without any inhibitor. The reduction of the nitrogen content of the films of these solutions is compared as a function of the time and set forth in FIG. 6.

Considering now the problems which are involved in dissolving polyacrylonitrile in sulfuric acid of relatively low concentration, it is noted that polyacrylonitrile can be dissolved in sulfuric acid of between 75 and 80% concentration at temperatures of between −10° to +30° C. It also also has been proposed to dissolve polyacrylonitrile in sulfuric acid of at least 65% concentration, at temperatures of between about 20 and 25° C., however, dissolution of polyacrylonitrile even at such relatively high temperatures can be accomplished in sulfuric acid of 65% concentration only after a treating period measured in weeks. Furthermore, the extruded bodies such as filaments formed on such solutions have certain disadvantageous properties. Even at temperatures as low as between about +10 and +20° C., hydrolysis of the CN-groups of the polymerizate will proceed quickly in strongly concentrated sulfuric acid solutions. Due to this fact, already during the spinning of the solution to fibers and filaments, the composition and quality of the extruded product is subject to progressive changes, whereby essential qualities such as tear-resistance and breaking strength deteriorate with the increase in the period of time between formation of the solution and spinning of the same. Simultaneously, all the other important characteristics such as the ability to accept dyes will change during the spinning process. In other words, the extrusion product of spinning solution which is spun first and thus has been in existence for a shorter period of time will have different and generally better qualities than that formed of the last portion of the batch entering the spinning nozzles.

The qualities of the finished product are even poorer if the solution, after it has been prepared, is stored for some time prior to being processed, i.e., extruded.

According to the feature of the present invention presently discussed, it is possible to dissolve polyacrylonitrile in sulfuric acid of relatively low concentration, such as concentrations of between 65 and 75%, and for practical purposes rather between 68 or 70% and 75%, at temperatures of between −10° C. and +20° C., so that the polyacrylonitrile will be quickly dissolved without being deteriorated, whereby solutions are obtained which are stable for longer periods of time.

This is accomplished according to the present invention by dissolving in the sulfuric acid which is used for dissolution of the polyacrylonitrile, sulfates which are soluble in such sulfuric acid. Preferably, the sulfates of ammonium and/or aluminum are used for this purpose. However, any other sulfate which is soluble in sulfuric acid of the above concentration within the range of between about 0.5% and 5% may be used for increasing the solubility of polyacrylonitrile. Thus, for instance indium sulfate could be used to replace the ammonium or aluminum sulfate, however, obviously and primarily for economical reasons, such substitution would not seem to be practical.

The amount of sulfate which is to be added to the sulfuric acid in which the polyacrylonitrile is to be dissolved, may be up to the proportion thereof which can be dissolved in such sulfuric acid and thus may vary between wide ranges. Preferably, the amount of sulfate will be kept between 0.5% and 5% by weight of the sulfuric acid and very good results are obtained by dissolving an amount of sulfate equal to between 2 and 3% of the weight of the sulfuric acid.

In this manner, according to the present invention, it is possible to dissolve the polyacrylonitrile at temperatures below 20° C. in short periods of time such as between about 10 and 30 minutes, without causing appreciable decomposition of the polymer. To proceed in this manner has the further advantage that even at processing temperatures of between +10 and 20° C., there is very little change in the composition of the spinning solution during the period of time which lapses from the start of the extrusion or spinning to the completion of processing of the batch.

As stated further above, the term polyacrylonitrile is to be understood to include not only pure polyacrylonitrile, but also mixed and graft polymerizates and copolymerizates of acrylonitrile with other polymerizable compounds, as well as mixtures of polyacrylonitrile and other polymerizates, however, the present invention is primarily concerned with the dissolving and extruding of polymer compositions including at least about 85% polyacrylonitrile, or not considerably less than 85% thereof.

The improvement in the dissolution of polyacrylonitrile is preferably achieved by dissolving aluminum sulfate in the sulfuric acid solvent, however, it is also possible to use other sulfates such as ammonium sulfate, whereby it is of course essential that a sulfate is used which is sufficiently soluble in sulfuric acid of the above described relatively high concentrations.

Without limiting the present invention to any specific theoretical explanation of the processes and reactions involved in improving the solubility of polyacrylonitrile in sulfuric acid by the addition thereto of a soluble sulfate, it could be assumed, for instance, that by proceeding in accordance with the present invention inorganic complex compounds are formed and that thereby the hydrogen ion concentration within the solution is reduced, or that in a different manner the addition of the salt will have a buffer effect on the solution.

By using a polymerizate having a molecular weight of between about 50,000 and 70,000 such as is frequently the case in the production of filaments, and using a polymerizate which, for instance, consists of pure polyacrylonitrile, or of a copolymerizate thereof containing up to 6% of a vinyl component, it will be found that the lower limit of concentration of the sulfuric acid at which such polymerizate can be dissolved will be at about 73% sulfuric acid concentration. Sulfuric acid of lesser concentration will not be suitable for forming homogeneous solutions at a working temperature of between about +10 and +20° C., which temperature range appears to be the most practical. By operating at temperatures above 20° C., it is possible after some period of time to obtain at least a partial dissolution of the polymerizate even in sulfuric acid of less than 73% concentration, however, under such circumstances, the dissolved polymers are subject to a very considerable degree of decomposition and the solution is no longer suitable for spinning purposes.

When, however, according to the present invention for instance 6% of the weight of sulfuric acid of crystallized aluminum sulfate $Al_2(SO_4)_3 \cdot 18H_2O$ are added to the sulfuric acid which without such addition would have to have a concentration of preferably between 74 and 75%, then it is possible to reduce the concentration of sulfuric acid to 70% or somewhat below 70%, in other words, to obtain satisfactory dissolution of the polymer within a concentration range of sulfuric acid which is so low that without the addition of the sulfate dissolution of the polymer would not longer be possible. Furthermore, by operating in this manner, i.e., with sulfuric acid of relatively low concentration to which a sulfate has been added, the saponification of the polymer is greatly retarded. The very considerable technical advantages which flow from proceeding in this manner, namely with a sulfuric acid of such low concentration that saponification is retarded while, on the other hand, obtaining satisfactory solution of the polymer due to the addition of the sulfate, are very significant.

Upon spinning a batch of such a solution containing sulfuric acid of relatively low concentration and also containing a dissolved sulfate, under normal temperature conditions, i.e., at temperatures of between 10 and 20° C., it is possible to obtain spun fibers which from the starting of processing of the batch until the same has been completely processed are of equal qualities with respect to their strength, extensibility, shrinking characteristics, as well as with respect to their behavior upon dyeing.

The quality of the spinning solution can be further improved by first forming a paste-like mass of the polymer and sulfuric acid of low concentration, i.e., sulfuric acid of a concentration which is too low to dissolve the polymer but which might be sufficiently high to cause swelling of the polymer. The thus formed paste or suspension is then mixed with sulfuric acid of higher concentration in which a sulfate has been dissolved and the polymer is dissolved in the thus formed mixture. Obviously, the amount and concentration of the more highly concentrated sulfuric acid must be so chosen that the concentration of the combined sulfuric acids in the thus formed mixture is sufficiently high for dissolving the polymer. It is an advantage of proceeding in the last described manner that the individual components of the solution can be individually evacuated so as to be quickly and completely freed of air while still in highly fluid condition, prior to forming the mixture and, furthermore, that the polyacrylonitrile suspension in sulfuric acid of low concentration can be stored without substantial deterioration. In addition, in this manner it is possible to obtain quickly and without deterioration of the suspended polyacrylonitrile a complete and lump-free solution, whereby only few CN-groups will be transformed into carbamide groups. The latter feature is most important for maintaining the desired qualities of the polymer and of the fibers or other shaped bodies formed thereof.

As described further above, it is also within the scope of the present invention to combine the introduction of a solubility improving sulfate with dissolving in the sulfuric acid a substance which is adapted to react with sulfuric acid at a greater rate of speed than the rate at which the saponification of the high polymer by the sulfuric acid proceeds, so that the rate of saponification of the high polymer will be greatly reduced.

It is of course also possible and within the scope of the present invention, to add to the spinning solution or the like pigments or dyes or other conventional additives.

Broadly, the spinning solution containing a sulfate may be prepared in a particular advantageous manner by forming a paste or dough-like mass of polyacrylonitrile powder in 68% sulfuric acid at a temperature between 0 and 25° C., and to stir this mass under vacuum until the paste or the like has been freed of occluded air. In the meantime, a sulfate such as aluminum sulfate is dissolved, if necessary under heating, in 80% sulfuric acid. The amount of sulfate will be equal to between 5 and 65% of the weight of the polyacrylonitrile powder. Approximately equal amounts by weight of 80% sulfuric acid and 68% sulfuric acid are used. The sulfate-80% sulfuric acid solution is cooled to room temperature, at which temperature it can be stored for indefinite periods of time, and is then sucked into the dough or paste-like mixture of polyacrylonitrile powder and 68% sulfuric acid, which is continued to be stored under vacuum, while the temperature of the thus formed mixture is maintained at between 0 and 25° C., preferably between 12 and 16° C. After the entire amount of sulfate-80% sulfuric acid solution thus has been introduced, it will be seen that the polyacrylonitrile is quickly dissolved and, upon continuing stirring for a short period of time, a clear, practically colorless and bubble-free solution is obtained which may be spun immediately. In this manner, it is possible to form highly viscous spinning solutions which may contain up to about 11% of polyacrylonitrile and in which during the preparation of the solution further additives may be incorporated such as dyes, pigments or saponification inhibitors, for instance formamide.

The following examples are primarily directed to spinning solutions in which a solubility improving sulfate has been incorporated and again it is noted that the scope of the invention is not meant to be limited to the specific details of the examples.

*Example 7*

72 g. of pulverulent mixed polymerizates containing 95% polyacrylonitrile and 5% acrylic acid methylester (K-value 89) are degassed in a partial vacuum under stirring. Thereafter, under continued stirring, 391.5 g. of 68% sulfuric acid are sucked into the container holding the mixed polymerizate, while maintaining the partial vacuum therein, and stirring is continued until the thus formed paste or suspension is free of bubbles. A solution of 45 g. of $Al_2(SO_4)_3 \cdot 18H_2O$ in 391.5 g. of 80% sulfuric acid, which solution had been prepared under heating and subsequently cooled to 20° C., is now sucked into the paste or suspension while stirring is continued, and after thus introducing the entire sulfate-containing concentrated sulfuric acid, stirring is further continued until the polymerizate is completely dissolved. In this manner it is possible to obtain quickly a colorless, clear, bubble-free, highly viscous solution. During the entire process of dissolving the mixed polymerizate, the temperature is maintained at about 20° C. The amount of aluminum sulfate, calculated as $Al_2(SO_4)_3$, equals 32% of the weight of the mixed polymerizate, and the finished solution contains 8% polyacrylonitrile. The solvent used according to the present example consists of 391.5 g. 68% sulfuric acid, 391.5 g. 80% sulfuric acid and 45.0 g. $Al_2(SO_4)_3 \cdot 18H_2O$, and the sulfuric acid concentration of the finished solution thus will be 70% by weight.

The thus formed viscous solution of the mixed polymerizate is spun into fibers 75 minutes after the 80% sulfuric acid had been added. Spinning takes 30 minutes.

A comparison experiment was carried out under exactly the same condition, however, without the addition of aluminum sulfate.

Table 3 below summarizes comparison between the proportion of saponified CN-groups found in the fibers produced at the beginning of the spinning process and at the end of the spinning process when using spinning solutions prepared as described above, with or without a sulfate. Comparative dye experiments also showed that the dye acceptance of the fibers spun without aluminum sulfate increased markedly from the beginning of the spinning towards the completion of the spinning of the batch, which is a further proof of the uneven quality of the material produced without the aluminum sulfate. On the other hand, the fibers spun from an aluminum sulfate-containing solution, upon dyeing were of even color and tone irrespective of whether the fibers were taken from the first spun portion or from the end of the batch.

TABLE 3

|  | Percent Saponified CN-Groups | |
|---|---|---|
|  | At the Beginning of Spinning | At the End of Spinning (after 30 minutes) |
| With $Al_2(SO_4)_3$ | 4 | 5.5 |
| Without $Al_2(SO_4)_3$ | 6.5 | 13.5 |

In Table 1a below, the percentage amount of saponified nitrile groups, calculated from the nitrogen content, is shown which is found in films of regenerated polyacrylonitrile which had been extruded immediately after forming the solution, or after storing the solution for 3 and 6 hours, respectively, at 20° C. Again, comparative values are given for the solutions prepared with and without addition of aluminum sulfate. In the comparison solutions, i.e. in the solutions which did not contain any sulfate, the sulfate was replaced by an equal amount of 74% sulfuric acid.

TABLE 3A

|  | Saponified CN-Groups at 20° C. | | |
|---|---|---|---|
|  | After 0 hrs. | After 3 hrs. | After 6 hrs. |
| With $Al_2(SO_4)_3$ | 0.4% | 15.5% | 30.5% |
| Without $Al_2(SO_4)_3$ | 2% | 23% | 42.5% |

*Example 8*

72 g. of a mixed polymerizate consisting of polyacrylonitrile plus 5% of acrylic acid methylester are degassed under a partial vacuum. Thereafter, the polymerizate is stirred with 387 g. of 68% sulfuric acid in the manner described in Example 1 and thereafter 387 g. of 80% sulfuric acid in which 54 g. of $Al_2(SO_4)_3 \cdot 18H_2O$ had been dissolved, are introduced in the manner described in Example 1. These process steps are all carried out at 15° C. In this manner a colorless, bubble-free, highly viscous solution is quickly obtained, containing 8% of the polymerizate. The quantity of aluminum sulfate, calculated as $Al_2(SO_4)_3$, equals 38.5% of the weight of the polymer.

The solvent thus consists of 387 g. 68% sulfuric acid, 387 g. 80% sulfuric acid and 54 g. $Al_2(SO_4)_3 \cdot 18H_2O$, and consequently contains 69.2% sulfuric acid.

Table 4 below shows a comparison of the proportion of the saponified nitrile groups found immediately after preparation of the solution, and after letting the same stand for 3 and 6 hours.

TABLE 4

| Solution | Saponified CN-Groups at 15° C. | | |
|---|---|---|---|
|  | After 0 hrs. | After 3 hrs. | After 6 hrs. |
| With $Al_2(SO_4)_3$ | 0.4% | 6% | 26% |
| Without $Al_2(SO_4)_3$ | 3.5% | 17% | 38% |

*Example 9*

20 g. of a mixed polymerizate consisting of polyacrylonitrile plus 5% acrylic acid methylester are degassed in a partial vacuum under stirring and then a paste is formed of the degassed mixed polymerizate and 89 g. 68% sulfuric acid. After a short period of further degassing, the mixed polymerizate of the paste is dissolved by the further addition of 89 g. of 80% sulfuric acid in which 2 g. ammonium sulfate were dissolved. In this manner quickly a practically colorless, clear and bubble free, highly viscous 10% solution of the polymerizate is obtained which contains 10% ammonium sulfate based on the weight of the polymer. This process is carried out in its entirety at a temperature of 12°. In order to determine the extent of saponfication of the nitrile groups, the solution is stored for 6 hours at 12° C.

The solvent is composed of 89 g. 68% sulfuric acid, 89 g. 80% sulfuric acid and 2 g. $(NH_4)_2SO_4$, and thus contains 73.25% sulfuric acid.

Table 5 below compares the proportion of saponified nitrile groups in a solution produced as described above, and in a solution produced in a similar manner but without the addition of the ammonium sulfate.

TABLE 5

| Solution | Saponified CN-Groups at 12° C. | | |
|---|---|---|---|
| | After 0 hrs. | After 3 hrs. | After 6 hrs. |
| With $(NH_4)_2SO_4$ | 3.8% | 7.8% | 24.7% |
| Without $(NH_4)_2SO_4$ | 5.5% | 21.0% | 38.5% |

*Example 10*

72 g. of a mixed polymerizate consisting of polyacrylonitrile plus 5% acrylic acid methylester are worked up as described in Example 1, however, with 391.5 g. of 71% sulfuric acid to which under cooling 9 g. of formamide had been added. After forming a suspension or paste in this manner and degassing the thus-formed paste, 391.5 g. of 80% sulfuric acid in which 45 g. of $Al_2(SO_4)_3 \cdot 18H_2O$ had been dissolved, are added as described in the previous examples. A clear, substantially colorless, highly viscous solution is obtained including 7.92% of polymerizate and an amount of $Al_2(SO_4)_3$ equal to 32% of the weight of the polymer. During the entire process of forming the solution, the temperature is maintained at 20° C.

The solvent thus consists of 391.5 g. 71% sulfuric acid, 391.5 g. 80% sulfuric acid and 45.0 g. $Al_2(SO_4)_3 \cdot 18H_2O$, and thus contains 71.5% sulfuric acid.

Table 6 below compares the proportion of saponified CN-groups upon formation of the solution, after 3 hours and after 6 hours with the corresponding percentages in a solution which was similarly prepared, however, without addition of formamide and aluminum sulfate.

TABLE 6

| Solution | Saponified CN-Groups at 20° C. | | |
|---|---|---|---|
| | After 0 hrs. | After 3 hrs. | After 6 hrs. |
| With additions | 0.9% | 16.0% | 27.5% |
| Without additions | 5.5% | 29.0% | 43% |

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a method of making acrylonitrile polymer fibers, the steps of forming a spinning solution of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile in sulfuric acid having a concentration of between 65 and 85% and having dissolved therein a substance having at least one amide group and being adapted to react with said sulfuric acid at a greater rate of speed than the rate at which said high polymer will be saponified by said sulfuric acid, and also having dissolved therein a sulfate soluble in said concentrated sulfuric acid, whereby saponification of said high polymer will be retarded due to the presence of said substance, and the solubility of said high polymer in said concentrated sulfuric acid will be improved due to the presence of said sulfate; and extruding the thus formed spinning solution through a spinneret into a coagulating bath adapted to coagulate the dissolved acrylonitrile polymer so as to form fibers of acrylonitrile polymer in said coagulating bath.

2. In a method of making acrylonitrile polymer fibers, the steps of forming a spinning solution of a high polymer selected from the group consisting of polyacylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile in sulfuric acid having a concentration of between 65 and 85% and having dissolved therein a substance having at least one nitrile group and being adapted to react with said sulfuric acid at a greater rate of speed than the rate at which said high polymer will be saponified by said sulfuric acid, and also having dissolved therein a sulfate soluble in said concentrated sulfuric acid, whereby saponification of said high polymer will be retarded due to the presence of said substance, and the solubility of said high polymer in said concentrated sulfuric acid will be improved due to the presence of said sulfate; and extruding the thus formed spinning solution through a spinneret into a coagulating bath adapted to coagulate the dissolved acrylonitrile polymer so as to form fibers of acrylonitrile polymer in said coagulating bath.

3. In a method of making acrylonitrile polymer fibers, the steps of forming a spinning solution of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile, in sulfuric acid having a concentration of between 65 and 85% and having dissolved therein a substance adapted to react with said sulfuric acid at a greater rate of speed than the rate at which said high polymer will be saponified by said sulfuric acid said substance being selected from the group consisting of carboxylic acid amides, acetoacetic ester, formic acid-ethyl ester, ammonium formiate, ammonium acetate, acetanhydride, propionic acid anhydride, acetyl acetone, $\beta,\beta'$-dicyandiethyl sulfide, n-butyl titanate, o-phosphoric acid, and glycolic acid-n-butyl ester, and also having dissolved therein a sulfate soluble in said concentrated sulfuric acid and selected from the group consisting of aluminum sulfate and ammonium sulfate, whereby saponification of said high polymer will be retarded due to the presence of said substance, and the solubility of said high polymer in said concentrated sulfuric acid will be improved due to the presence of said sulfate; and extruding the thus formed spinning solution through a spinneret into a coagulating bath adapted to coagulate the dissolved acrylonitrile polymer so as to form fibers of acrylonitrile polymer in said coagulating bath.

4. In a method of making acrylonitrile polymer fibers, the steps of forming a spinning solution of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile, in sulfuric acid having a concentration of between 70–80% and having dissolved therein 1–5% of a substance having at least one amide group and being adapted to react with said sulfuric acid at a greater rate of speed than the rate at which said high polymer will be saponified by said sulfuric acid, whereby saponification of said high polymer will be retarded due to the presence of said substance; and extruding the thus formed spinning solution through a spinneret into a coagulating bath adapted to coagulate the dissolved acryonitrile polymer so as to form fibers of acrylonitrile polymer in said coagulating bath.

5. In a method of making acrylonitrile polymer fibers, the steps of forming a spinning solution of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile, in sulfuric acid having a concentration of between 70–80% having dissolved therein 0.5–5% of a sulfate soluble in said concentrated sulfuric acid, whereby the solubility of said high polymer in said concentrated sulfuric acid will be improved due to the presence of said sulfate; and extruding the thus formed spinning solution through a spinneret into a coagulating bath adapted to coagulate the dissolved acrylonitrile polymer so as to form fibers of acrylonitrile polymer in said coagulating bath.

6. Acrylonitrile polymer spinning solution, comprising sulfuric acid of between 70 and 80% concentration having dissolved therein between about 1 and 16% by weight of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile and also having dissolved therein between about 1 and 5% by weight of a substance adapted to react with said sulfuric acid at a greater rate of speed than the rate at which said high polymer will be saponified by said sulfuric acid said substance being selected from the group consisting of carboxylic acid amides, acetoacetic ester, formic acid-ethyl ester, ammonium formiate, ammonium acetate, acetanhydride, propionic acid anhydride, acetyl acetone, $\beta,\beta'$-dicyandiethyl sulfide, n-butyl titanate, o-phosphoric acid, and glycolic acid-n-butyl ester, and further having dissolved therein between about 0.5 and 5% of a sulfate soluble in said concentrated sulfuric acid and selected from the group consisting of aluminum sulfate and ammonium sulfate, whereby saponification of said high polymer will be retarded due to the presence of said substance and the solubility of said high polymer in said concentrated sulfuric acid will be improved due to the presence of said sulfate.

7. Acrylonitrile polymer spinning solution, comprising sulfuric acid of between about 70 and 80% concentration having dissolved therein between about 1 and 16% by weight of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide, methacrylic acid nitrile, and also having dissolved therein between about 1 and 5% by weight of a substance adapted to react with said sulfuric acid at a greater rate of speed than the rate at which said high polymer will be saponified by said sulfuric acid said substance being selected from the group consisting of carboxylic acid amides, acetoacetic ester, formic acid-ethyl ester, ammonium formiate, ammonium acetate, acetanhydride, propionic acid anhydride, acetyl acetone, $\beta,\beta'$-dicyandiethyl sulfide, n-butyl titanate, o-phosphoric acid, and glycolic acid-n-butyl ester, whereby saponification of said high polymer will be retarded due to the presence of said substance.

8. Acrylonitrile polymer spinning solution, comprising sulfuric acid of between about 70 and 80% concentration having dissolved therein between about 1 and 16% by weight of a high polymer selected from the group consisting of polyacrylonitrile and mixed polymers of acrylonitrile with at least one substance selected from the group consisting of acrylic acid esters, methacrylic acid esters, vinyl acetate, vinyl chloride, vinylidene chloride, alkenyl-carboxylic acid amides, alkenyl-carboxylic acids, allyl chloride, allyl alcohol, vinyl pyrrolidone, vinyl amide, vinyl pyridine, vinylidene cyanide and methacrylic acid nitrile, and also having dissolved therein between about 0.5 and 5% of a sulfate soluble in said concentrated sulfuric acid and selected from the group consisting of aluminum sulfate and ammonium sulfate, whereby the solubility of said high polymer in said concentrated sulfuric acid will be improved due to the presence of said sulfate.

9. Acrylonitrile polymer spinning solution, comprising sulfuric acid of at least 65% concentration, having dissolved therein an acrylonitrile polymer and a sulfate soluble in said sulfuric acid and selected from the group consisting of aluminum sulfate and ammonium sulfate, the amount of said sulfate being such as to form a substantially saturated solution thereof in said sulfuric acid, whereby the solubility of said acrylonitrile polymer is improved due to the presence of said dissolved sulfate.

10. Acrylonitrile polymer spinning solution, comprising sulfuric acid of between about 68 and 75% concentration, having dissolved therein an acrylonitrile polymer and a sulfate soluble in said sulfuric acid in an amount of between 0.5% and the amount required to form a saturated solution of said sulfate in said sulfuric acid, whereby the solubility of said acrylonitrile polymer is improved due to the presence of said dissolved sulfate.

11. Acrylonitrile polymer spinning solution, comprising sulfuric acid of at least 65% concentration, having dissolved therein a mixed polymerizate including at least 85% acrylonitrile and at least 5% acrylic acid methyl ester and a sulfate soluble in said sulfuric acid, whereby the solubility of said acrylonitrile polymer is improved due to the presence of said dissolved sulfate.

12. Acrylonitrile polymer spinning solution, comprising sulfuric acid of at least 65% concentration, having dissolved therein a copolymerizate of acrylonitrile including about 5% of a vinyl component and a sulfate soluble in said sulfuric acid, whereby the solubility of said acrylonitrile polymer is improved due to the presence of said dissolved sulfate.

No references cited.

WILLIAM H. SHORT, *Primary Examiner.*

LEON J. BERCOVITZ, *Examiner.*